United States Patent [19]
Terada

[11] 4,451,415
[45] May 29, 1984

[54] METHOD FOR MANUFACTURE OF FOAMED CERAMIC ARTICLE

[75] Inventor: Shoji Terada, Nagoya, Japan

[73] Assignees: Agency of Industrial Science & Technology; Ministry of International Trade & Industry, both of Tokyo, Japan

[21] Appl. No.: 397,778

[22] Filed: Jul. 13, 1982

[30] Foreign Application Priority Data

Jul. 16, 1981 [JP] Japan .................................. 56-111261

[51] Int. Cl.³ .............................................. B29H 7/20
[52] U.S. Cl. ....................................... 264/43; 501/80; 501/84
[58] Field of Search ..................... 264/43, 332; 501/34, 501/80, 84; 521/85, 103

[56] References Cited

U.S. PATENT DOCUMENTS

| 3,607,170 | 9/1971 | Malesak | 264/43 |
| 3,753,933 | 8/1973 | Olstowski et al. | 521/103 |
| 4,123,285 | 8/1978 | Schuster et al. | 501/84 |
| 4,207,114 | 6/1980 | Schuster et al. | 264/43 |
| 4,356,271 | 10/1982 | Frances et al. | 501/84 |

Primary Examiner—Donald E. Czaja
Assistant Examiner—W. Thompson
Attorney, Agent, or Firm—Oblon, Fisher, Spivak, McClelland & Maier

[57] ABSTRACT

A foamed ceramic article is manufactured by adding hexagonally crystalline boron nitride as a foaming agent to a raw material formed preponderantly of a feldspar group mineral and sintering the resultant mixture.

9 Claims, No Drawings

METHOD FOR MANUFACTURE OF FOAMED CERAMIC ARTICLE

BACKGROUND OF THE INVENTION

This invention relates to a novel method for the manufacture of a foamed ceramic article. More particularly this invention relates to a novel method for the manufacture of a foamed ceramic article containing numerous independent cells by the steps of mixing a powdered silicate mineral consisting preponderantly of feldspar group mineral and a small amount of hexagonally crystalline boron nitride, sintering the resultant composition, and cooling the sintered composition.

Foamed ceramic articles are lighter than ordinary ceramic articles and have high chemical stability. Because of these features, they find extensive utility as aggregates and insulating materials in buildings. Various methods have been developed for manufacture of such foamed ceramic articles. They are represented by the following methods.

One method produces a foamed ceramic article by crushing to a fixed particle size a water-containing silicate mineral, typically swelling shale or perlite, or a mineral having a hydroxyl group in the crystalline structure and suddenly heating the resultant crushed mineral thereby giving rise to a foamed ceramic article by utilizing the abnormal swelling phenomenon which occurs in consequence of either dehydration or change in crystalline structure.

Another method produces a foamed ceramic article by adding a mixture of sodium hydroxide and or potassium hydroxide with sodium carbonate as a fusing agent for foaming to volcanic ash or clay and sintering the resultant mixture.

There is also known a method which produces a foamed ceramic article by using sodium phosphate or calcium phosphate as a foaming agent ("Industrial Materials," Vol. 29 No. 6, pp 14–15 (1981), published by Nikkan Kogyo Shimbunsha).

The methods for the manufacture of foamed ceramic articles described above each has its merits and demerits. For example, the method which produces a foamed ceramic article by crushing natural rock, typically swelling shale or perlite, and suddenly heating the resultant crushed mineral has an advantage that foamed ceramic articles can be produced most inexpensively where a rich deposit of the mineral is available. On the other hand, this method has a disadvantage in that since the natural mineral is used in its unmodified form without use of a foaming agent, there is inevitably variation in the chemical composition of the mineral and the foaming temperature of the mineral and, as a consequence, the condition of foaming of the crushed mineral can be controlled only with great difficulty. The mineral as the raw material is produced in limited regions. Thus, there are places at which commercial production of foamed ceramic articles by this method proves unprofitable.

In the case of the method which produces foamed ceramic articles by adding a mixture of sodium hydroxide and or potassium hydroxide with sodium carbonate as a fusing agent for foaming to volcanic ash or clay and sintering the resultant mixture, use of water can cause undesired elutriation of alkali component so that this method requires dry mixing of the raw materials and dry molding of the resultant mixture. This method also has a disadvantage in that during the step of sintering, temperature must be controlled very rigidly to ensure uniformization of the diameters of the cells formed within the foamed ceramic articles. It has a further disadvantage that since it necessitates use of an alkali fixing agent, the foamed ceramic articles have an increased alkali content and, consequently, have their chemical durability notably degraded.

In the circumstance, therefore, development of a method which permits production of foamed ceramic articles without entailing any one of the drawbacks suffered by the aforementioned conventional methods, i.e. regionally limited availability of raw material, exacting control of foaming conditions, and degradation of produced foamed ceramic articles due to incorporation of an alkali into ceramic substance, is now strongly in demand.

SUMMARY OF THE INVENTION

This invention relates to a method for the manufacture of a foamed ceramic article, and more particularly to a novel method for the manufacture of a foamed ceramic article which permits the condition of foaming to be easily controlled and which avoids degrading the quality of the ceramic and confers outstanding chemical properties to the foamed ceramic article.

In the respect that this invention involves addition of a foaming agent to the raw material for a foamed ceramic article and the effervesce of a foaming agent during the sintering of the resultant mixture, the method of this invention is the same as part of the known technique. It is characterized by using hexagonally crystalline boron nitride as a foaming agent and further by enabling a silicate mineral including feldspar group mineral or mica group mineral, a very common raw material for ceramics, to be used as the main raw materials.

Specifically, the method of this invention produces a foamed ceramic article by adding a small amount of hexagonally crystalline boron nitride as a foaming agent to a powdered raw material formed solely of feldspar group mineral or consisting preponderantly of feldspar group mineral and additionally incorporating at least one member selected from the group consisting of kaolinite, sericite, silica, limestone, magnesite, and petalite, sintering the resultant mixture at a temperature at which the mineral as the raw material fuses and swells by foaming, and then cooling the sintered mixture. By the method of this invention, a foamed ceramic article having improved uniformity of cells can be produced by using as the raw material what is obtained by sintering the aforementioned mineral as raw material thereby vitrifying at least part of the mineral and finely crushing the partially vitrified sintered mineral.

The present invention further embraces a method which comprises heating the mineral as raw material thereby partially foaming the mineral, cooling the partially foamed mineral, crushing and molding the cooled foamed mineral, thereafter sintering the molded mineral by the same procedure as described above, and cooling the sintered mixture.

DETAILED DESCRIPTION OF THE PREFERRED EMBODIMENTS

The main raw material used in the present invention is a silicate mineral such as feldspar group mineral or feldspar-containing mica group mineral which is widely called potter's clay. Broadly speaking, feldspar group mineral occurs in the form of orthoclase ($KAlSi_3O_8$), soda feldspar ($NaAlSi_3O_8$), and anothite ($CaAl_2O_8$). It also occurs abundantly in the form of microcline. All these forms of feldspar group mineral are usable as the raw material for the present invention. Among other forms of feldspar group mineral, microcline having a low melting temperature has been demonstrated to give particularly advantageous results by the method of the present invention.

In accordance with this invention, such feldspar group mineral is used either alone or in combination with at least one member selected from the group consisting of kaolinite, sericite, silica, limestone, magnesite, and petalite. The reason for the desirability of using such an additive mineral is as follows. The fused product obtained when the feldspar group mineral is sintered has a fairly high viscosity. When the aforementioned additive mineral is contained in a suitable amount in the fused product, the temperature of fusion of the raw material is lowered and the viscosity of the fused product is lowered so much as to facilitate the generation of foamed condition.

Particularly when a lithium-containing additive mineral (such as, for example, petalite) is used, the foamed ceramic article to be obtained has a small thermal expansion coefficient.

The proportion of the additive mineral to be added to the feldspar group mineral is in the range of 0.02 to 1 based on the unity of the feldspar group mineral by weight. If the proportion is below the lower limit, use of this additive mineral has no effect. If it exceeds the upper limit, the range of sintering temperature in which the foamed ceramic article is obtained is narrow and the foamed ceramic article obtained tends to acquire lower chemical stability.

By the method of the present invention, hexagonally crystalline boron nitride is used as the foaming agent for the production of a foamed ceramic article. This boron nitride is a finely divided, very soft, white substance. Chemically it is a highly stable compound. This compound is known to remain undecomposed up to about 2000° C. when it is heated under a neutral or reducing atmosphere. When such thermally stable hexagonally crystalline boron nitride is held in contact with a silicate mineral kept in a fused state at elevated temperatures, it begins to react with the boron nitride much sooner than might be expected. Then, part of the hexagonally crystalline boron nitride melts and passes in the form of $B_2O_3$ into the fused mineral with simultaneous evolution of nitrogen gas or nitrogen oxide gas.

This invention, based on the knowledge of this particular phenomenon, is essentially directed to producing a foamed ceramic article by preparing a powdered silicate mineral incorporating therein a suitable amount of hexagonally crystalline boron nitride, pelletizing or otherwise molding the powdered composition, and sintering the molded powdered composition.

Since the hexagonally crystalline boron nitride is a finely divided substance with an unusually high lubricating ability, it is mixed very easily with other powdery substances. Further since it is a chemically stable substance, it is not deprived of its properties even when it is used as mixed with various molding aids.

When the hexagonally crystalline boron nitride is added as a foaming agent to a powdered silicate mineral, therefore, the foaming agent is not elutriated from the prepared mineral composition even if the composition is molded by a wet molding method or casting method in the course of the manufacture of the foamed ceramic article. It is, therefore, no longer necessary to worry about the otherwise possible local alteration of the foaming condition due to the elutriation of the foaming agent. This fact proves to constitute a major advantage for the method of this invention from the practical point of view.

By the method of this invention, the aforementioned raw material is crushed to a suitable particle size and the hexagonally crystalline boron nitride is mixed in the aforementioned proportion with the powdered raw material. The resultant mixed powder is sintered. The temperature of the sintering is required to be such that the mineral as the raw material may be transformed into a fused state. Since the foamed ceramic article is required to have a shape suitable for its intended use, the aforementioned mixed powder may be compression molded in a metal die or it may be wetted with a small amount of added water and manually molded in a desired shape.

During the molding, an agent such as dextrin or methyl cellulose which is useful for facilitating the molding of the mixed powder may be suitably incorporated into the mixed powder.

When the hexagonally crystalline boron nitride which is extraordinarily stable at room temperature is heated under an oxidative atmosphere, the surface of this compound begins to undergo oxidation in the neighborhood of 700° C. gradually to form a layer of $B_2O_3$. When the hexagonally crystalline boron nitride in this state comes into contact with a silicate mineral in a fused state, they quickly react with each other and the former compound dissolves into the latter compound. At the same time, the portion of the fused silicate which has undergone the reaction mentioned above has its viscosity lowered by the influence of $B_2O_3$. In the portion affected by the reaction, the hexagonally crystalline boron nitride emits nitrogen gas or nitrogen oxide gas due to its decomposition. As the evolution of such a gas continues, foaming occurs.

Consequently, there is formed a foamed mass of fused mixed powder. When this mass is cooled to solidify, the desired foamed ceramic article is obtained.

The hot foamed article need not be gradually cooled at a specific controlled speed but may be allowed to cool off spontaneously within the furnace used for the sintering.

The cells in the foamed ceramic article obtained as described above are generally independent cells having diameters roughly in the range of 0.2 to 1.5 mm.

For the purpose of obtaining a foamed ceramic article containing cells with no appreciable variation in diameter, it suffices to effect the manufacture thereof by the steps of sintering a powdered silicate mineral as the raw material at a temperature high enough for at least part of the powder to be vitrified, cooling and crushing the resultant partially vitrified mineral powder, mixing the crushed mineral powder with hexagonally crystalline boron nitride as a foaming agent, and subjecting the resultant mixed powder to the aforementioned procedure of the method of this invention. The foamed ceramic article thus produced contains cells having diameters falling in a narrower range of about 0.3 to 0.7 mm.

In the manner described above, even a substance such as a feldspar group mineral which, on being fused, acquires too high viscosity to permit foaming can be easily foamed and converted into a richly foamed article.

From the standpoint of practical utility, the present invention is highly significant in the sense that it enables foamed ceramic articles to be manufactured successfully by using as the main raw material therefor abundantly occurring feldspar group mineral and metamorphosed rock-forming minerals such as, for example, potter's clay and sericite; that it permits substances exhibiting very high degrees of viscosity in their fused state to be used effectively as raw materials; and that it produces foamed ceramic articles having better properties than those produced by the conventional method.

Now, the present invention will be specifically described below with reference to working examples.

EXAMPLE 1

A mixed raw material consisting of 60% of Fukushima feldspar (mineralogically microcline, produced in Fukushima Prefecture of Japan) and 40% of Amakusa potter's clay (potters' clay, mineralogically a mixture of soda feldspar, sericite, kaolinite, and silica, produced in Amakusa of Japan) was finely pulverized amply in a pot mill. The resultant powdered mineral was thoroughly mixed with 5% by weight of powdered hexagonally crystalline boron nitride (having particle diameters of 1 to 5 $\mu$m).

In a cylindrical metal die 10 mm in diameter, 1 g of this mixture was placed and compression molded under pressure of 100 kg/cm$^2$. The molded mass thus produced was placed in an electric furnace and sintered at 1300° C. for two hours in an open air. The speed of temperature increase was 150° C./hr.

When the sintered molded mass was cooled, there was obtained a foamed article having a white glossy surface and a moderately irregular contour. The foamed article had a bulk density of 0.44 and contained cells of diameters of 0.4 to 0.9 mm. The thermal expansion coefficient of the foamed article was $3.3 \times 10^{-6}$.

EXAMPLE 2

A mixed raw material of the same composition (60% of Fukushima feldspar and 40% of Amakusa potter's clay) as indicated in Example 1 was mixed with 3% (by weight) of powdered boron nitride. The resultant mixture was placed in a refractory crucible and suddenly heated to 1240° C. In consequence of this thermal treatment, the mixed raw material in the crucible assumed a partially foamed state.

The partially foamed mass was removed from the crucible and crushed into particles not exceeding 100 $\mu$m in diameter. The powder thus obtained was mixed with 5% by weight of a molding aid (produced by Asahi Chemical Industry and marketed under trademark "Avicel"), placed in a metal die, and compression molded under pressure of 100 kg/cm$^2$ to produce a cylindrical test piece 10 mm in diameter. This test piece was sintered at 1260° C. in an electric furnace. When the sintered mass was cooled, there was obtained a foamed ceramic article having a glossy surface. The foamed ceramic article proved to be useful as a light-weight aggregate. This foamed ceramic article had a bulk density of 0.38 and contained cells of diameters of about 0.5 to 0.7 mm. The thermal expansion coefficient of the foamed ceramic article was $3.0 \times 10^{-6}$.

EXAMPLE 3

A mixture of equal weights of petalite (Li$_2$O·Al$_2$O$_3$·8SiO$_2$) and microcline was thoroughly mixed with 2% by weight of powdered hexagonally crystalline boron nitride (particle size 1 to 5 $\mu$m) by stirring. The mixture thus obtained was compression molded in the shape of a block. This block was placed in an electric furnace and sintered at 1360° C. under a neutral atmosphere. The sintered block was cooled. The foamed ceramic article thus produced had a white glossy surface. It was observed to contain cells of relatively large diameters of 0.9 to 1.5 mm. The foamed ceramic article had a bulk density of 0.50. The thermal expansion coefficient of this foamed ceramic article was $2.2 \times 10^{-6}$.

EXAMPLE 4

In a mortar made of Sinterkorund, powdered orthoclase and 2% by weight of powdered hexagonally crystalline boron nitride were thoroughly ground and mixed. In a cylindrical metal die 10 mm in diameter, 1 g of the resultant mixture was compression molded. The molded mass was placed in an electric furnace and sintered at 1250° C. When the sintered molded mass was cooled, there was obtained a foamed ceramic article having a vitreous gloss on the surface. This foamed ceramic article had a bulk density of 0.62 and contained cells of diameters of about 0.1 to 0.4 mm. The thermal expansion coefficient of this foamed ceramic article was $6.2 \times 10^{-6}$.

EXAMPLE 5

A mixture of equal weights of petalite and microcline was sintered at 1300° C. in a refractory crucible. In consequence of the sintering, the mixture was partially vitrified. The hot mixture was cooled and then removed from the refractory crucible. It was crushed enough to be passed completely through a sieve of 170 mesh, to be used as a starting material.

This raw material was throughly mixed with 1.5% by weight of powdered hexagonally crystalline boron nitride. The resultant mixture was kneaded with a small amount (10% in concentration) of an aqueous dextrin solution to prepare a dough. The dough was dried, placed in an electric furnace, sintered at 1240° C., and cooled. In consequence of the sintering treatment, there was obtained a foamed ceramic article having a white glossy surface and a conspicuously irregular contour. It had a bulk density of 0.52. The cells in the foamed ceramic article had diameters of about 0.9 to 1.1 mm, more uniform than those of the foamed ceramic article of Example 3. The thermal expansion coefficient of this foamed ceramic article was $2.4 \times 10^{-6}$.

EXAMPLE 6

Anorthite (CaAl$_2$Si$_2$O$_8$), soda feldspar (NaAlSi$_3$O$_8$), lime stone, and magnesite were combined in respective proportions of 45%, 50%, 2% and 3% and mixed until uniformly blended. The resultant mixture was stirred with a small amount (concentration 10%) of an aqueous dextrin solution, to prepare a dough. This dough was dried.

The dry mass thus obtained was placed in an electric furnace, and sintered at 1360° C., and then cooled. The product was a foamed ceramic article having a gray surface and a conspicuously irregular contour. The bulk density of this article was 0.78. The cells in this foamed ceramic article had diameters of about 0.4 to 1.3 mm. The thermal expansion coefficient of this article was $6.2 \times 10^{-6}$.

What is claimed is:

1. A method for the manufacture of a foamed ceramic article, adding to a powdered feldspar group mineral a foaming agent consisting of 0.1 to 10% by weight of powdered hexagonally crystalline boron nitride, sintering the resultant mixture at a temperature high enough for said feldspar group mineral to be fused and swelled, and thereafter cooling the sintered mixture, said feldspar group mineral being at least one member selected from the group consisting of orthoclase, soda feldspar, anorthite, and microcline.

2. A method according to claim 1, wherein prior to adding foaming agent said powdered feldspar group mineral is obtained by crushing a feldspar group mineral, subsequently sintering the crushed mineral until at least part thereof is vitrified, cooling the sintered mineral, and crushing the cooled mineral.

3. A method for the manufacture of a foamed ceramic article, comprising the steps of mixing a feldspar group mineral with at least one additive mineral selected from the group consisting of kaolinite, silica, lime stone, magnesite, and petalite, mixing the resultant powdered mineral with 0.1 to 10% by weight of hexagonally crystalline boron nitride as a foaming agent, subsequently sintering the resultant mixed mineral at a temperature high enough for the mineral to be fused and swelled, and cooling the fused and swelled mineral.

4. A method according to claim 3, wherein the mixing ratio of the feldspar group mineral and the additive mineral is 0.02 to 1 of the latter to unity of the former by weight.

5. A method according to claim 3, wherein prior to adding foaming agent the powdered mineral is obtained by mixing a feldspar group mineral with at least one additive mineral selected from the group consisting of kaolinite, sericite, silica, lime stone, magnesite, and petalite, crushing the resultant mixture, subsequently sintering the mixture until part thereof is vitrified, cooling the sintered mixture, and crushing the cooled mixture.

6. A method according to claim 3, wherein the feldspar group mineral is at least one member selected from the group consisting of orthoclase, soda feldspar, anorthite, and microcline.

7. A method for the manufacture of a foamed ceramic article, comprising the step of mixing a powdered mineral as a raw material with 0.1 to 10% by weight of powdered hexagonally crystalline boron nitride, heating the resultant powdered mixture thereby causing the raw material to foam partially, cooling and crushing the partially foamed mineral, molding the crushed mineral in a given shape, sintering the molded mineral at a temperature high enough for the molded mineral to be fused and foamed, and cooling the foamed mineral.

8. A method according to claim 7, wherein the mineral powder as the raw material is formed solely of a feldspar group mineral.

9. A method according to claim 7, wherein the powdered mineral as the raw material is a mixture of a feldspar group mineral with at least one additive mineral selected from the group consisting of kaolinite, sericite, silica, magnesite, and petalite.

* * * * *